(12) United States Patent
Albl et al.

(10) Patent No.: US 11,904,632 B2
(45) Date of Patent: Feb. 20, 2024

(54) WHEEL HUB FOR A VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 503 days.

(21) Appl. No.: 16/979,429

(22) PCT Filed: Feb. 11, 2019

(86) PCT No.: PCT/EP2019/053266
§ 371 (c)(1),
(2) Date: Sep. 9, 2020

(87) PCT Pub. No.: WO2019/174833
PCT Pub. Date: Sep. 19, 2019

(65) Prior Publication Data
US 2021/0001664 A1     Jan. 7, 2021

(30) Foreign Application Priority Data

Mar. 16, 2018 (DE) ...................... 10 2018 204 095.8

(51) Int. Cl.
*B60B 27/02* (2006.01)
(52) U.S. Cl.
CPC .................................... *B60B 27/02* (2013.01)
(58) Field of Classification Search
CPC ...................................................... B60B 27/02
See application file for complete search history.

(56) References Cited

U.S. PATENT DOCUMENTS

| 2,781,231 A | 2/1957 | Black |
| 6,116,700 A | 9/2000 | Herrera |

(Continued)

FOREIGN PATENT DOCUMENTS

| CN | 1946946 A | 4/2007 |
| CN | 204526628 U | 8/2015 |

(Continued)

OTHER PUBLICATIONS

English translation of the International Preliminary Report on Patentability and Written Opinion dated Oct. 1, 2020 in corresponding International Application No. PCT/EP2019/053266; 10 pages.

(Continued)

*Primary Examiner* — Scott A Browne
(74) *Attorney, Agent, or Firm* — Maier & Maier, PLLC

(57) ABSTRACT

A wheel hub for mounting a wheel to rotate about an axis of rotation, having a flange, which has at least one fastening member, by which a rim of the wheel can be fastened at least in the axial direction of the wheel hub to the flange and thereby to the wheel hub, and having a centering seat formed on an extension projecting axially from the flange of the wheel hub, which centering seat includes multiple centering surface segments successively disposed and spaced apart from each other in the circumferential direction of the wheel hub and facing outwards in the radial direction of the wheel hub, by which segments the rim can be centered relative to the wheel hub in the radial direction thereof, wherein the single-piece extension has an inner lateral face extending continuously in the circumferential direction and facing inwards in the radial direction.

19 Claims, 1 Drawing Sheet

(56) References Cited

U.S. PATENT DOCUMENTS

| | | | | |
|---|---|---|---|---|
| 6,257,678 | B1 * | 7/2001 | Brookey | B60B 27/02 |
| | | | | 301/105.1 |
| 8,287,052 | B2 * | 10/2012 | Fakhoury | B60B 27/0057 |
| | | | | 301/105.1 |
| D787,394 | S * | 5/2017 | Hammer | D12/180 |
| 2014/0252846 | A1 | 9/2014 | Sawant | |

FOREIGN PATENT DOCUMENTS

| | | |
|---|---|---|
| CN | 105848921 A | 8/2016 |
| CN | 107009817 A | 8/2017 |
| DE | 10260467 A1 | 7/2004 |
| DE | 102009015950 A1 | 9/2010 |
| DE | 202010009776 U1 | 9/2010 |
| DE | 102012213527 A1 | 2/2014 |
| DE | 102012219903 A1 | 4/2014 |
| EP | 0834670 A1 | 4/1998 |
| EP | 1500524 A2 | 1/2005 |
| EP | 2221194 A1 | 8/2010 |
| EP | 3170678 A1 | 5/2017 |
| WO | 2004076203 A2 | 9/2004 |
| WO | 2014/019737 A1 | 2/2014 |

OTHER PUBLICATIONS

German Examination Report dated Mar. 9, 2020 in corresponding German Application No. 10 2018 204 095.8; 20 pages; Machine translation attached.

German Examination Report dated Nov. 15, 2018 in corresponding German Application No. 10 2018 204 095.8; 10 pages; Machine translation attached.

International Search Report (with English translation) and Written Opinion (with Machine translation) dated Apr. 3, 2019 in corresponding International Application No. PCT/EP2019/053266; 20 pages.

Office Action dated Feb. 10, 2023, in corresponding Chinese Application No. 201980019013.4, 23 pages.

\* cited by examiner

WHEEL HUB FOR A VEHICLE

FIELD

The disclosure relates to a wheel hub for a vehicle, particularly a motor car. The disclosure further relates to a wheel bearing assembly and a vehicle, particularly a motor vehicle.

BACKGROUND

Such a wheel hub, for a vehicle which, for example, is configured as a motor vehicle, particularly a motor car, can be found as prior art in DE 10 2009 015 950 A1. The wheel hub is used to mount a wheel of a vehicle, particularly on a wheel carrier, rotatably about an axis of rotation or rotationally. To this end, the wheel hub has a flange which comprises at least one fastening member. The fastening member can be used to fasten a rim of the wheel to the flange, at least in the axial direction of the wheel hub, and thereby fasten it to the wheel hub. The rim can particularly be connected to the flange and thereby to the wheel hub in a rotationally fixed manner using the fastening member, such that, for example, torques can be transmitted between the wheel hub and the rim or the wheel as a whole, respectively. The wheel hub further comprises an extension projecting from the flange on which a centering seat of the wheel hub is formed. The centering seat has multiple centering surface segments disposed in the circumferential direction of the wheel hub at a spacing from each other and facing outwards in the radial direction of the wheel hub, by means of which segments the rim can be easily centered relative to the wheel hub in the radial direction of the wheel hub. To this end, centering surface segments can support themselves on the rim or vice versa, particularly in the radial direction of the wheel hub. If the rim is disposed on the wheel hub, for example, by disposing the rim in the radial direction of the wheel hub in supportive abutment with the centering surface segments, the rim is centered thereby relative to the wheel hub in the radial direction of the wheel hub.

Furthermore, DE 102 60 467 A1 discloses a wheel bearing and brake disk assembly consisting of a roller bearing with a flange disposed thereon, which flange contains first fastening openings for attaching the rim and the pot-shaped fastening member of the brake disk. A wheel bearing means is also known from EP 2 221 194 A1.

DE 10 2012 213 527 A1 further discloses a wheel hub having a wheel flange extending in the radial direction and comprising a fastening surface, having a cylindrical extension for at least partially receiving a roller bearing and extending axially from the wheel flange on the vehicle side, and having a centering device disposed axially on the wheel side, concentrically with the axis of rotation of the wheel hub, which device is provided to receive a wheel rim or brake disk.

SUMMARY

It is the object of the present invention to develop a wheel hub, a wheel bearing assembly, and a vehicle of the type mentioned at the outset in such a manner, that the wheel hub can on the one hand be of high strength and particularly long durability and on the other hand be lightweight, and that corrosion due to the accumulation of water in the area of the wheel center can be kept particularly low.

This object is achieved, according to the disclosure, by a wheel hub and by a wheel bearing assembly and by a vehicle.

A first aspect of the invention relates to a wheel hub for a vehicle, which is particularly configured as a motor vehicle, particularly as a motor car, preferably as a passenger car. The wheel hub can be rotatably mounted to a wheel carrier of the vehicle, for example by means of a wheel bearing, particularly configured as a roller bearing, and can therefore be rotated about an axis of rotation in the completed state of the vehicle, particularly relative to the wheel carrier. In the completed state of the vehicle, the wheel hub is taking its installation position. The wheel hub is used for rotatable or rotational mounting of at least one wheel of the vehicle, such that the wheel is mounted for rotation about the axis of rotation relative to the wheel carrier by means of the wheel hub in the completed state of the vehicle, for example.

The wheel hub has a flange with at least one fastening member. The flange may comprise at least one or more other fastening members, wherein the fastening members are disposed, for example, sequentially or one after the other in the circumferential direction of the wheel hub and thus of the flange. The fastening members are particularly evenly distributed along the circumference of the wheel hub and thus of the flange. The previous and following statements regarding the respective fastening member can easily be transferred to the respective other fastening members, and vice versa. The fastening member can be used to fasten a rim of the wheel of the vehicle to the flange, at least in the axial direction of the wheel hub, and thereby fasten it to the wheel hub. Particularly, the rim can be supported on the flange in the axial direction of the wheel hub, at least indirectly, particularly directly. The rim can typically be supported axially on the flange via a brake disk and can thus be tensioned against the flange via the brake disk, such that the brake disk is axially disposed between the rim and the flange in the completed state of the vehicle, for example. Then the rim can be supported axially on the flange via the brake disk and tensioned against the brake disk. For example, the rim can be tensioned in the axial direction of the wheel hub at least indirectly, particularly directly, against the flange and thus against the wheel hub using the fastening member to secure the rim at least axially to the wheel hub. This prevents relative movements between the wheel hub and the rim at least in the axial direction. It is further conceivable that the rim can be connected in a rotationally fixed manner to the flange and thus in a rotationally fixed manner to the wheel hub by means of the flange, particularly by means of the fastening member to prevent relative rotation between the rim and the wheel hub or to be able to transmit torques between the rim and the wheel hub. It is specifically conceivable that the rim can be fastened frictionally or non-positively to the flange and thus to the wheel hub using the fastening member.

The wheel hub further comprises an extension projecting axially, that is, in the axial direction of the axis of rotation, from the flange, on which extension a centering seat of the wheel hub is formed. The centering seat has multiple centering surface segments disposed circumferentially at a spacing from each other and facing outwards in the radial direction of the wheel hub, by means of which segments the rim can be easily centered radially relative to the wheel hub, particularly with respect to the axis of rotation. The centering seat or the centering seat segments, respectively, are for example disposed inside the fastening member in the radial direction of the wheel hub, which is farther inwards than the fastening member. In other words, the fastening member is disposed radially farther outwards in the radial direction of the wheel hub than the centering seat or the centering surface segments. The centering surface segments are preferably disposed on the same diameter, particularly with respect to the axis of rotation.

The centering surface segments can for example be supported radially on the rim, specifically on a hub of the rim. Since the centering surface segments point radially outwards, the centering surface segments can be supported radially on an inner circumferential lateral face of the rim, specifically of the hub of the rim. To fasten the rim to the wheel hub, the rim is at least partially disposed on the wheel hub, specifically on the centering seat, specifically in such a manner that the centering seat and thus the centering surface segments are disposed in the hub of the rim. The rim is supported on the centering surface segments, whereby the rim is centered relative to the wheel hub in the radial direction of the wheel hub. This centering positions the rim for example coaxial with the axis of rotation and coaxial with the wheel hub, such that quiet running of the rim and thus of the wheel as a whole can overall be ensured.

To implement on the one hand particularly high strength and particularly long durability, and on the other hand make the wheel hub as lightweight as possible, the single-piece extension, according to the invention, has an inner lateral face which extends along the entire circumference without any interruption and which faces radially inwards.

As noted above, a continuous centering seat which extends completely or continuously along the same diameter in the circumferential direction is the standard. To reduce weight and discharge water, the centering seat, also simply referred to as seat, is segmented, in the prior art by an axial indent or a so-called crown shape. This axial indent or segmentation, however, results in the disadvantage that the stiffness and strength of the wheel hub are diminished. According to the invention, no axial segmentation but radial segmentation of the centering seat is proposed to keep ensuring water runoff to prevent the wheel from rusting but to maintain the continuous extension, for example formed as a tube.

Furthermore, the actually single-piece flange, which is preferably integral with the extension, has an outer lateral face facing radially outwards, which surface forms the centering surface segments. This means that the centering surface segments are first parts or first subsections of the outer lateral face. The outer lateral face is designed or configured in such a manner that the centering surface segments have a first radial distance that is, a distance extending in the radial direction of the wheel hub, to the axis of rotation. Furthermore, the outer lateral face comprises other surface segments, which are disposed circumferentially between the centering surface segments and which have a second radial distance, that is, a distance extending in the radial direction of the wheel hub, from the axis of rotation which distance is smaller than the first radial distance. This means that the other surface segments are second parts or second subsections of the outer lateral face, wherein the second parts are disposed farther radially inwards than the first parts. Since the other surface segments are disposed between the centering surface segments, exactly one of the other surface segments is disposed between each two immediately successive centering surface segments in the circumferential direction of the wheel hub, for example.

Preferably, the other surface segments transition into the centering surface segments without interruption, or vice versa, such that preferably the outer lateral face is continuous as well, that is, fully closed, in the circumferential direction. The circumferentially uninterrupted inner lateral face allows the implementation of particularly high strength and long durability. Since the centering surface segments are at the same time spaced apart from each other in the circumferential direction, the centering seat is segmented, particularly in the circumferential direction, such that the weight of the wheel hub can be kept particularly low and a water runoff and thus improved corrosion protection are included. The centering surface segments together form an overall centering surface, which is divided by the circumferential segmentation of the centering seat in the circumferential direction of the wheel hub and thus divided into the individual centering surface segments. While the centering surface segments enable centering of the rim, the other surface segments do not contribute to centering the rim. While the centering surface segments are thus part of the centering seat, the other surface segments are regions different from the centering seat, particularly with respect to its function, and are for example spaced at least radially apart from the rim, particularly when the rim is positioned or seated on the centering seat.

Due to the radial segmentation of the centering seat, the wheel hub can be produced with little manufacturing effort compared to axial segmentation, particularly with reduced forging forces and reduced wear during machining since the lateral face is physically present as a continuous, uninterrupted lateral face and extends fully closed along the circumference, the wheel hub has a considerably higher strength and longer durability than prior art solutions in which gaps or interruptions are provided between the centering surface segments.

The segmentation of the centering seat described above is also called radial segmentation or segmentation in the radial direction and allows, for example, that water accumulating in the centering seat, also called rim seat, can run off, particularly on a side which cannot be optically perceived by outside viewers of the vehicle. This prevents water from exiting on a design side optically perceivable by outside viewers of the vehicle and adversely influencing the appearance of the rim. Due to the radial segmentation in combination with forming a fully closed inner lateral face, the centering seat or extension, respectively, can have a closed form, enabling particularly high stiffness and strength of the wheel hub, particularly of the flange. Furthermore, radial segmentation allows the installation of a protective cap inside the centering seat, also called rim seat or wheel seat, for example, to be able to protect the interior of the flange against corrosion or to hide corrosion behind the protective cap. This ensures a particularly advantageous optical appearance of the vehicle as a whole.

Radial segmentation also has machining advantages. The closed form described above allows configuration of the extension as a closed profile, which prevents bouncing off of turrets and thus sawtooth formation during machining. This ensures higher precision with respect to centering the rim and thus the wheel as a whole.

The shared diameter of the centering surface segments mentioned above, on which the centering surface segments are disposed, for example, is also referred to as the first diameter and corresponds, for example, to a first radius, particularly with respect to the axis of rotation. Thus the centering surface segments are disposed on the first radius, for example. The first radius preferably is a first outer radius, such that the first diameter preferably is a first outer diameter.

The wheel hub has a second diameter, for example, which is smaller than the first diameter, and which corresponds, for example, to a second radius, particularly with respect to an axis of rotation. The second radius preferably is an inner radius, such that the second diameter preferably is an inner diameter. The second diameter preferably is coaxial with the first diameter, particularly with respect to the axis of rotation, wherein the second diameter is for example smaller than the first diameter. The lateral face is at least partially, particularly at least mainly or completely disposed on the second diameter, for example, particularly if the lateral face is cylindrical or circular. The inner lateral face can alternatively have a shape different from a cylinder, for example an elliptical shape. The inner lateral face forms or defines, for example, a hollow cross section of the wheel hub, particularly a closed one. The hollow cross section is for example a hub element, also called hub, of the wheel hub, said hub element or the hollow cross section preferably being fully closed in the circumferential direction. This ensures particularly high strength and durability.

Furthermore, the wheel hub, for example, has a third diameter, which may correspond to a third radius, particularly with respect to the axis of rotation. The third radius preferably is for example a second outer radius, such that the third diameter is a respective second outer diameter. The third diameter is preferably greater than the second diameter and smaller than the first diameter. The other surface segments are for example disposed on the third radius or the third diameter, respectively. Particularly in the case in which the other surface segments are planar or flat, this means that the respective tangents placed on the respective other surface segments are tangents of the third diameter or of a circle having the third diameter, wherein the third diameter or the circle is coaxial with the first diameter and the second diameter, particularly with respect to the axis of rotation. Due to this design and arrangement of the diameters, the closed shape mentioned above or the closed profile mentioned above can be implemented, such that high strength and durability as well as a particularly light weight of the wheel hub can be achieved.

The extension extends preferably continuously away from the flange in the axial direction and completely closed in the circumferential direction, such that particularly high lasting strength and durability can be implemented. Thus the extension is for example formed as the profile mentioned above, wherein the extension forms or comprises the diameters, for example.

It has proven particularly advantageous if the circumferentially continuous lateral face extends continuously in the axial direction from the flange to an end of the extension situated axially opposite the flange, which extension ends at said end in the axial direction. In this way, particularly high strength and durability of the wheel hub can be achieved while the weight is favorably affected.

In another embodiment of the invention, the extension ends in the axial direction on a side of an end face situated opposite the flange, wherein the end face is also called the overall end face of the extension an is for example disposed on the end mentioned above.

The centering surface segments end in the axial direction at the respective first partial end faces of the extension disposed on the end, for example, wherein the other surface segments end in the axial direction at respective second partial end faces of the extension disposed on said end. The partial end faces are respective parts of the overall end face and in total form the overall end face. The first partial end faces can be at the same level as the second partial end faces in the axial direction, or the first partial end faces can be recessed relative to the second partial end faces, or vice versa, in the axial direction. The overall end face is preferably continuous in the circumferential direction of the wheel hub, that is, it is uninterruptedly circumferential. In other words, the end face mentioned above is preferably fully closed in the circumferential direction or an uninterruptedly circumferential overall end face of the wheel hub. If the partial end faces are positioned at the same axial level, for example, the overall end face extends fully closed in the circumferential direction of the wheel hub at the level at which the axial partial end faces are disposed.

The overall end face is for example at least substantially circular, such that the overall end face is for example formed as an annular surface which is fully closed in the circumferential direction of the wheel hub or extends along the entire circumference. Since the overall end face is physically present as an annular section and extends fully closed along the circumference, the wheel hub has a considerably higher strength and longer durability than prior art solutions with axial segmentation.

To keep the costs of the wheel hub as low as possible, the end face is planar in another embodiment of the invention and extends obliquely or vertically to the plane extending in the axial direction. The axial direction can coincide with the axis of rotation, for example. Alternatively, the end face can be uneven, for example corrugated.

Another embodiment is characterized in that the other surface segments of the outer lateral face are planar and recessed with respect to the centering surface segments, particularly moved radially closer to the axis of rotation, that is, radially inwards. In this way, particularly high strength and long durability as well as the radial segmentation of the centering seat can be implemented in a cost-effective manner. The feature that the other surface segments are recessed radially inwards relative to the centering surface segments means that the centering surface segments, for example, are farther outward in the radial direction than the other surface segments, such that, referring to the diameters described above, the first diameter is greater than the third diameter, for example.

Another embodiment is characterized in that the other surface segments are formed by mechanical machining, particularly by milling, and that they are recessed. Segmentation is thus formed by removing material, for example.

Another way of producing the wheel hub in a particularly favorable manner with respect to weight and costs is that the other surface segments are made by primary shaping, for example by casting or forging, and that they are recessed. Segmentation is thus formed by leaving out material of which the wheel hub is made, for example.

The wheel hub is preferably single-piece to keep the number of parts, the costs, and the weight of the wheel hub particularly low. Furthermore, the wheel hub is preferably produced by forging, such that the lateral faces, for example, are formed and recessed by forging.

In another embodiment of the invention, one of the centering surface segments is circumferentially disposed at the same level as the fastening member to implement particularly robustness and stability of the wheel hub. In other words, a respective centering surface segment is disposed radially below the respective fastening member, for example, such that the fastening members and the centering surface segments are circumferentially not disposed offset from each other, but at the same level.

It is further conceivable that the centering surface segments are disposed circumferentially offset from the fastening member(s). The radial segmentation is thus for example disposed or aligned at or between the fastening members.

The respective fastening member is preferably formed as an opening, particularly a through opening, wherein the respective opening can particularly be formed as a borehole. The opening which is particularly formed as a borehole can for example be a wheel screw opening, particularly a wheel screw borehole, or a wheel bolt opening, particularly a wheel bolt borehole, such that a wheel screw or wheel bolt can be inserted in the respective opening, particularly inserted through the respective opening. By means of the respective wheel screw or wheel bolt, the rim can for example be fastened to the flange by screws and at least indirectly be tensioned against the flange, for example by means of the brake disk mentioned above. Alternatively, wheel bolts which are secured to the wheel hub, particularly pressed into the wheel hub, which are also called stay bolts, are conceivable. The wheel bolts have a thread, for example, particularly a male thread onto which the respective wheel nut can be screwed. The rim or the wheel is screw-connected via wheel nuts and wheel bolts, such that the rim is indirectly tensioned against the flange by means of the wheel nuts.

A third aspect of the invention relates to a wheel bearing assembly which has a wheel hub according to the first aspect of the invention integrated in the wheel bearing assembly. Advantages and advantageous embodiments of the first aspect of the invention are to be considered advantages and advantageous embodiments of the second aspect of the invention, and vice versa.

A third aspect of the invention relates to a vehicle, which is particularly configured as a motor vehicle, particularly as a motor car, such as a passenger car. The vehicle particularly includes a wheel hub according to the first aspect of the invention and/or a wheel bearing assembly according to the second aspect of the invention. Advantages and advantageous embodiments of the first aspect and the second aspect of the invention are to be considered advantages and advantageous embodiments of the third aspect of the invention, and vice versa. In the second aspect of the invention, specifically, the rim is fastened to the wheel hub in the manner described, wherein the wheel hub is preferably rotationally mounted to the wheel carrier mentioned.

Other advantages, features, and details of the invention can be derived from the following description of a preferred embodiment and from the drawing. The features and feature combinations mentioned above in this description as well as the features mentioned in the description of the figures below and/or shown in the figures alone are not just usable in the respective combination mentioned, but can be used as well in other combinations and alone without deviating from the scope of the invention.

BRIEF DESCRIPTION OF THE DRAWINGS

Wherein.

The same or similar components are assigned the same reference numerals in the figures.

DETAILED DESCRIPTION

Figure 1:
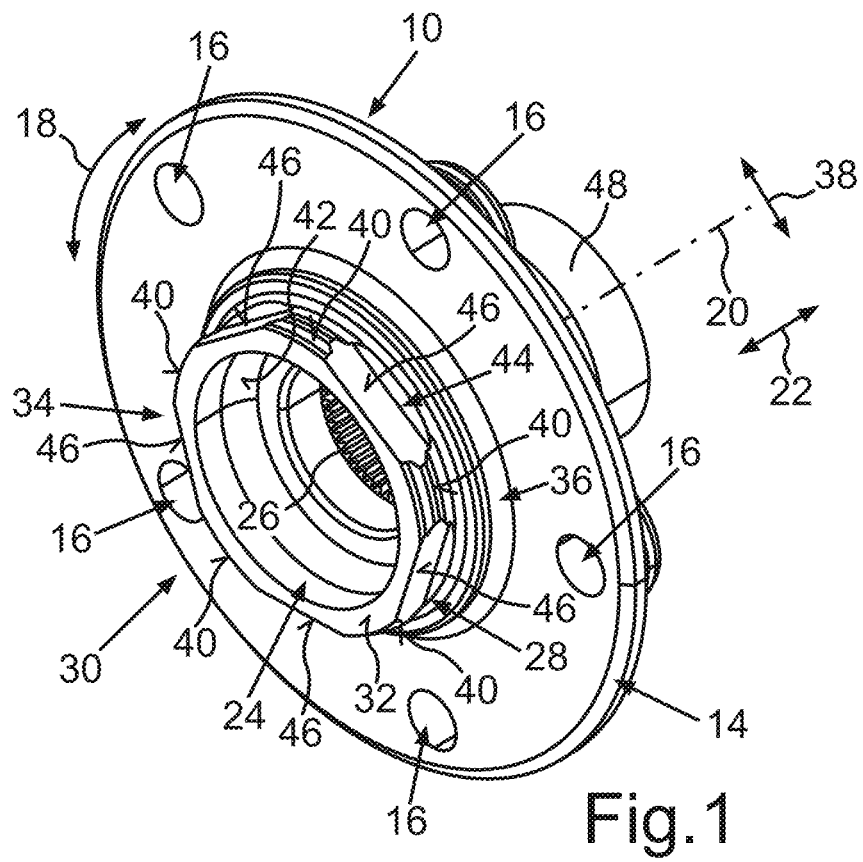
FIG. 1 shows a schematic perspective view of a finished part in the form of a wheel hub according to the invention for a vehicle.
Figure 2:
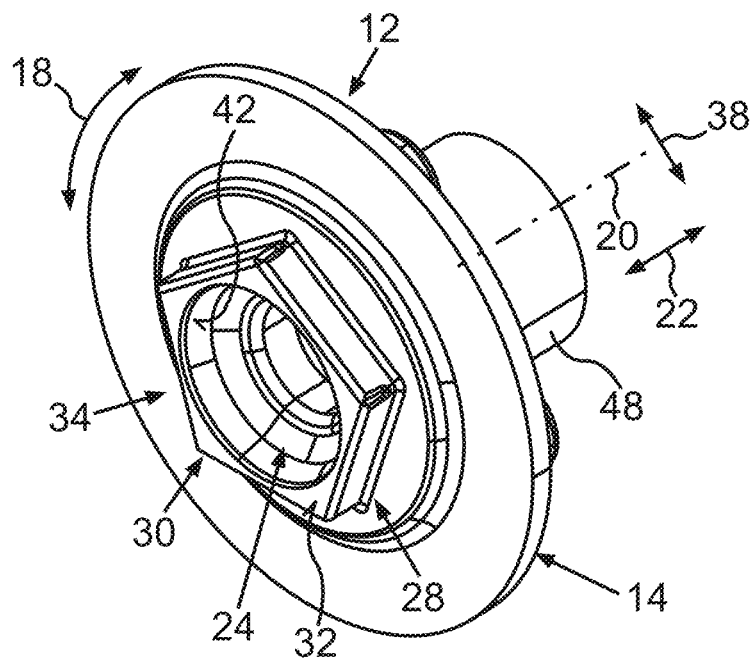
FIG. 2 shows a schematic perspective view of a blank part from which the wheel hub according to FIG. 1 can be produced, for example.

FIG. 1 shows a schematic perspective view of a finished part in the form of a wheel hub 10 for a vehicle, which is particularly configured as a motor vehicle, particularly as a motor car, preferably as a passenger car. FIG. 2 shows a blank part 12 produced by forging, from which the wheel hub 10 can be produced. To produce the wheel hub 10 from the blank part 12, for example, the blank part 12 is processed, particularly mechanically. The wheel hub 10 has a flange 14, which comprises a plurality of fastening members 16. The fastening members 16 are formed as openings, particularly as through openings, wherein the respective fastening member 16 can be formed as a borehole. The fastening members 16 are successively disposed in the circumferential direction of the wheel hub 10 and thus of the flange 14 and spaced apart from each other, wherein the fastening members 16 are evenly distributed in the circumferential direction of the wheel hub 10 and thus of the flange 14. The circumferential direction is illustrated in FIG. 1 by a double arrow 18 and extends about an axis of rotation 20, which is particularly shown schematically in FIG. 1. In the completely finished state, the wheel hub 10 is rotatably mounted to a corresponding wheel carrier of the vehicle, such that the wheel hub can 10 rotate relative to the wheel carrier about the axis of rotation 20. Particularly, the wheel hub 10 is rotatably mounted to the wheel carrier by means of at least one wheel bearing, which is for example formed as a ball bearing. The wheel hub 10 is preferably configured as a single piece.

A rim of a wheel of the vehicle, which rim is not shown in the figures, can be fastened to the wheel hub 10 in the axial direction of the wheel hub 10 by means of the fastening members 16 and thus by means of the flange 14. The axial direction of the wheel hub 10 is illustrated in FIG. 1 by a double arrow 22 and coincides with the axis of rotation 20. To connect the rim and thus the wheel as a whole to the flange 14 and thus to the wheel hub 10, the rim is positioned on the wheel hub 10 in such a manner that through openings of the rim overlap with, or cover, the fastening members 16. Then other fastening members, particularly in the form of screws, are inserted through the through openings of the rim and, for example, inserted into the fastening members 16. Particularly, the screw elements configured as wheel screws or wheel bolts are screwed into the corresponding openings of the fastening members 16, whereby the rim is tensioned against the flange 14. The rim is secured in this manner in the axial direction of the wheel hub 10. Furthermore, the rim and thus the wheel are connected to the wheel hub 10 in a rotationally fixed manner, such that torques can be transmitted between the wheel hub 10 and the rim. If the wheel hub 10 is driven, for example, the wheel is driven in the process, whereby the motor vehicle as a whole can be driven. The wheel hub 10 is thus used for rotatable or rotational mounting of the wheel about the axis of rotation 20.

For driving the wheel hub 10, the wheel hub is connected, for example, in a torque-transmitting manner to a shaft configured, for example, as a universal joint shaft, which is not visible in the figures. To this end, the wheel hub 10 has a hub 24, also called a hub element, which is formed by a closed hollow cross section of the wheel hub 10. The wheel hub 10 has a toothing 26 configured as an internal toothing, at least in a length region of the hub 24. Said shaft comprises another toothing configured as an external toothing and corresponding to the toothing 26, which toothing engages in the toothing 26. The shaft is thereby connected in a torque-transmitting manner to the wheel hub 10. If the shaft is therefore driven, at least indirectly, by a drive motor of the vehicle, the wheel hub 10 is driven by the shaft and thus rotated about the axis of rotation 20, particularly with respect to the wheel carrier. The hub 24 is formed or defined by an extension 28 of the wheel hub 10 which is also called a carrier or base carrier. The extension 28 projects axially, that is, in the axial direction of the wheel hub 10, from the flange 14. In other words, the extension 28 extends axially away from the flange 14 and terminates, for example in the axial direction, on a side 30 situated opposite the flange 14 on an end face 32 of the extension 28. The end face 32 is also called an overall end face and is disposed on an end 34 of the extension 28 located axially opposite the flange 14 or facing away therefrom, which extension terminates at the end 34.

The wheel hub 10 further comprises a centering seat 36, which is formed on the extension 28. The centering seat 36 includes multiple centering surface segments 40 disposed at a spacing from each other in the circumferential direction of the wheel hub 10 and facing outwards in the radial direction of the wheel hub 10, by means of which segments the rim can be easily centered relative to the wheel hub 10 in the radial direction of the wheel hub 10. The radial direction of the wheel hub 10 is illustrated by a double arrow 38 in FIGS. 1 and 2.

The respective centering surface segment 40 is radially convex and arcuate, wherein the centering surface segments 40 are disposed on the same diameter, particularly outer diameter, and are facing radially outwards. The aforementioned diameter is also called a first diameter. The aforementioned rim can be centered relative to the wheel hub in the radial direction thereof by means of the centering seat 36 in order to fasten the rim to the wheel hub 10. In other words, the rim is positioned on the wheel hub 10 as described above to fasten the rim to the wheel hub 10. To this end, the rim has a hub, which is also called a rim hub. The rim hub is disposed on the centering seat 36, particularly in such a manner that the centering seat 36 and thus the centering surface segments 40 are disposed in the rim hub. In this process, the rim, particularly a lateral face of the rim on its inner circumferential side and defining the rim hub, is supported radially inwards on the centering surface segments 40, or the centering surface segments 40 are supported radially outwards on the lateral face of the rim on the inner circumferential side. Thus the rim is positioned and centered in the radial direction of the wheel hub 10 relative to the same, particularly with respect to the axis of rotation 20, such that the wheel hub 10 and the rim are coaxial with respect to the axis of rotation 20. If the wheel hub 10 is driven and rotated about the axis of rotation 20, the rim or the wheel as a whole is rotated about the axis of rotation 20 as well.

The extension 28 is formed as such in one piece to be able to implement a particularly high strength and durability on the one hand and as light a weight of the wheel hub 10 as possible on the other. Furthermore, the extension 28 has an inner lateral face 42 which is circumferentially continuous and facing radially inwards, which surface is also called the lateral face of the extension 28 on the inner circumferential side and which forms or defines the hub 24. In the exemplary embodiment shown in FIGS. 1 and 2, the inner lateral face 42 is cylindrical. Furthermore, the extension 28 has an outer lateral face 44 which is facing radially outwards, which surface is also called the inner circumferential lateral face of the extension 28 and which forms or defines the hub 40. The outer lateral face 44 is configured or designed such that the centering surface segments 40 are at a first radial distance from the axis of rotation 20 and that other surface segments 46 of the outer lateral face 44 are disposed circumferentially between the centering surface segments 40 are at a second radial distance from the axis of rotation 20, which distance is smaller than the first radial distance. The centering surface segments 40 are first parts of the integral and circumferentially uninterrupted outer lateral face 44, wherein the other surface segments 46 are second parts of the outer lateral face 44. In total, these parts form the outer lateral face 44 and transition into each other without interruption and are therefore closed or continuous, particularly in the circumferential direction. In other words, the centering surface segments 40 are circumferentially without gaps or interruptions and thus connected completely continuously to each other and to the other surface segments 46 via the other surface segments 46, such that the parts in the circumferential direction of the wheel hub 10 transition into each other without gaps or interruptions and are thus fully closed.

The parts terminate at the same axial level in the axial direction, such that the end face 32 is planar and extends in a plane which extends obliquely or, in this case, vertically to the axis of rotation 20 or the axial direction, respectively. The end face 32 is a circumferentially completely closed overall end face of the wheel hub 10, particularly of the extension 28. In the exemplary embodiment shown, the overall end face extends fully closed in the circumferential direction of the wheel hub 10 at the axial level at which the parts terminate in the axial direction. Since the extension is in one piece and thus made of a uniform material and forms the parts of the outer lateral face, the parts are integral with each other. The extension 28 is preferably formed in one piece with the flange 14. The extension 28 and/or the flange 14 are preferably formed of a metallic material.

Since both the outer lateral face 44 and the inner lateral face 42 are circumferentially continuous, particularly their respective axial length extending axially from the flange 14 to the end 34, the extension 28 has a closed shape or a closed profile, such that the aforementioned hollow cross section forming the hub 24 is fully closed, both along its full axial extension and in the circumferential direction. This allows to achieve particularly high strength and durability. Furthermore, the extension 28 axially terminates at the end face 32 and thus on the side 30 on the end 34.

In order to space the centering surface segments 40 circumferentially apart from each other despite the continuous or fully closed configuration of the end face 32, which is configured, for example, as an annular surface or annular section, the other surface segments 46 are recessed inwards with respect to the centering surface segments 40 in the radial direction of the wheel hub 10. In addition, the other surface segments 46 are at least substantially planar or flat, such that they extend in imagined planes which are orthogonal to the axial direction or coincide with the axial direction, for example.

The extension 28 comprises the inner lateral face 42 radially inwards, which surface may be cylindrical and is disposed on a second diameter, particularly inner diameter, which is smaller than the first diameter. The hub 24 is thus circular on the inner circumferential side, at least in the region of the mentioned parts of the outer lateral face 44, and fully closed in the axial direction. The respective planes through which the other surface segments 46 extend, may contact a third diameter or an imaginary circle having said third diameter, wherein the third diameter is smaller than the first diameter and greater than the second diameter. The extension 28 is thus configured as a closed profile, allowing to ensure particularly high strength and durability of the wheel hub 10.

In the exemplary embodiment shown in the figures, the centering surface segments 40 are disposed circumferentially at an offset to the fastening members 16, such that the centering surface segments 40 are circumferentially disposed between the respective openings. Alternatively, it is conceivable that the respective centering surface segments 40 are disposed at the same level as the respective fastening members 16 in the circumferential direction and exactly below the fastening members 16 in the radial direction.

It is particularly well visible in FIG. 1 that the centering surface segments 40 in total form an overall centering surface for centering the rim, wherein the overall centering surface is divided in the circumferential direction of the wheel hub 10 and thus subdivided into centering surface segments 40. The centering surface segments 40 are thus segments of the overall centering surface and thus of the centering seat 36. The centering seat 36 is segmented due to the spacing apart of the centering surface segments 40 described above, wherein the described segmentation of the centering seat 36 is also called a radial segmentation. Due to this radial segmentation, the wheel hub 10 can be produced using small amounts of material, and the weight of the wheel hub 10 can be kept particularly low. At the same time, particularly high strength and durability can be implemented because no gaps or interruptions are provided between the segments in the circumferential direction; instead, the segments are connected to each other, thus forming the circumferentially fully closed end face 32.

The other surface segments 46, particularly their being recessed, are formed by material recesses, for example. The respective material recess is formed, for example, by machining and thus by removing material. This means, for example, that the blank part 12 comprises material in the region of the respective surface segment 46 to be produced, which material is removed, particularly milled off, for producing the respective other surface segment 46. The material is for example removed by machining, particularly by mechanical processing, such as milling. Alternatively, the respective surface segment 46 and its recessing can be formed by leaving out material, for example by primary shaping, particularly by forging, particularly without any processing steps following forging. This allows a particularly favorable production of the wheel hub 10 with respect to weight and costs.

The extension 28 extends from a first side of the flange 14 axially away from the flange. On a second side of the flange 14 which is situated opposite the first side of the flange 14 in the axial direction of the wheel hub 10, a subsection 48 also called a length region extends axially away from the flange 14, wherein the subsection 48 is for example integral with the extension 28 or formed by the extension 28. The subsection 48 is on its outer circumferential side at least substantially circular or cylindrical. For example, the outer circumference of the subsection 48 can be formed as a tube. The toothing 26 can be disposed in the subsection 48, at least partially, particularly at least predominantly or completely. The wheel hub 10 can be rotatably mounted to the wheel carrier specifically via the subsection 48, since the aforementioned wheel bearing configured as a ball bearing can be or is supported on the subsection 48.

The invention claimed is:

1. A wheel hub for mounting a wheel of a vehicle to rotate about an axis of rotation, comprising:
    a flange, which comprises:
        at least one fastening member, wherein a rim of the wheel can be fastened at least in an axial direction of the wheel hub to the flange and thereby to the wheel hub,
        a centering seat formed on an extension projecting axially from the flange of the wheel hub, wherein the centering seat comprises multiple centering surface segments successively disposed and spaced apart from each other in a circumferential direction of the wheel hub and facing outwards in a radial direction of the wheel hub, the multiple centering surface segments are spaced circumferentially without gaps or interruptions and connected completely continuously to each other by recessed surface segments, and the rim is centered relative to the wheel hub in the radial direction thereof, wherein the extension has
        an inner lateral face extending continuously in the circumferential direction and facing inwards in the radial direction,
        an outer lateral face facing outwards in the radial direction and forming the centering surface segments, the centering surface segments have a first radial distance from the axis of rotation and the recessed surface segments disposed circumferentially between the centering surface segments have a second radial distance from the axis of rotation which is smaller than the first radial distance,
        and fully closed in a circumferential direction, and
        the centering surface segments define the planar end face and are configured to directly radially support an inner circumferential surface of the rim.

2. The wheel hub according to claim 1, wherein the inner lateral face, which is continuous in the circumferential direction, continuously extends in the axial direction from the flange to an end of the extension situated axially opposite the flange.

3. The wheel hub according to claim 1, wherein the extension terminates in the axial direction at the end face on a side situated opposite the flange.

4. The wheel hub according to claim 1, wherein the recessed surface segments of the outer lateral face are planar and recessed radially closer to the axis of rotation with respect to the centering surface segments.

5. The wheel hub according to claim 4, wherein the recessed surface segments are formed and recessed by mechanical processing.

6. The wheel hub according to claim 4, wherein the recessed surface segments are formed and recessed by primary shaping.

7. The wheel hub according to claim 1, wherein the centering surface segments are disposed at an offset to the at least one fastening member in the circumferential direction.

8. A wheel bearing assembly, having the wheel hub according to claim 1 integrated into the wheel bearing assembly.

9. The wheel hub according to claim 2, wherein the extension terminates in the axial direction at the end face on a side situated opposite the flange.

10. The wheel hub according to claim 2, wherein the recessed surface segments of the outer lateral face are planar and recessed radially closer to the axis of rotation with respect to the centering surface segments.

11. The wheel hub according to claim 3, wherein the recessed surface segments of the outer lateral face are planar and recessed radially closer to the axis of rotation with respect to the centering surface segments.

12. The wheel hub according to claim 1, wherein the recessed surface segments of the outer lateral face are planar and recessed radially closer to the axis of rotation with respect to the centering surface segments.

13. The wheel hub according to claim 2, wherein the centering surface segments are disposed at an offset to the at least one fastening member in the circumferential direction.

14. The wheel hub according to claim 3, wherein the centering surface segments are disposed at an offset to the at least one fastening member in the circumferential direction.

15. The wheel hub according to claim 1, wherein the centering surface segments are disposed at an offset to the at least one fastening member in the circumferential direction.

16. The wheel hub according to claim 4, wherein the centering surface segments are disposed at an offset to the at least one fastening member in the circumferential direction.

17. The wheel hub according to claim 5, wherein the centering surface segments are disposed at an offset to the at least one fastening member in the circumferential direction.

18. The wheel hub according to claim 6, wherein the centering surface segments are disposed at an offset to the at least one fastening member in the circumferential direction.

19. A wheel bearing assembly, having the wheel hub according to claim 2 integrated into the wheel bearing assembly.

\* \* \* \* \*